United States Patent
Akiu et al.

(10) Patent No.: US 7,103,755 B2
(45) Date of Patent: Sep. 5, 2006

(54) APPARATUS AND METHOD FOR REALIZING EFFECTIVE PARALLEL EXECUTION OF INSTRUCTIONS IN AN INFORMATION PROCESSOR

(75) Inventors: Susumu Akiu, Kawasaki (JP); Masaki Ukai, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 502 days.

(21) Appl. No.: 10/339,414

(22) Filed: Jan. 10, 2003

(65) Prior Publication Data

US 2004/0003205 A1    Jan. 1, 2004

(30) Foreign Application Priority Data

Jun. 27, 2002    (JP)    ............................. 2002-188262

(51) Int. Cl.
*G06F 9/30* (2006.01)
*G06F 9/40* (2006.01)
*G06F 15/00* (2006.01)

(52) U.S. Cl. ...................... 712/215; 712/214; 712/212

(58) Field of Classification Search ................. 712/203
See application file for complete search history.

(56) References Cited

U.S. PATENT DOCUMENTS

| | | | | |
|---|---|---|---|---|
| 5,689,674 A | * | 11/1997 | Griffith et al. ............... 712/217 |
| 5,758,116 A | * | 5/1998 | Lee et al. .................... 712/210 |
| 5,909,573 A | * | 6/1999 | Sheaffer ...................... 712/240 |
| 6,014,735 A | * | 1/2000 | Chennupaty et al. ....... 712/210 |
| 6,105,127 A | | 8/2000 | Kimura et al. |
| 6,128,687 A | * | 10/2000 | Dao et al. .................... 710/305 |
| 6,175,911 B1 | * | 1/2001 | Oberman et al. ........... 712/221 |
| 6,604,188 B1 | * | 8/2003 | Coon et al. .................... 712/24 |

FOREIGN PATENT DOCUMENTS

| | | |
|---|---|---|
| JP | HEI 7-182168 | 7/1995 |
| JP | HEI 10-124316 | 5/1998 |
| JP | HEI 11-119998 | 4/1999 |

* cited by examiner

*Primary Examiner*—Eddie Chan
*Assistant Examiner*—Brian Johnson
(74) *Attorney, Agent, or Firm*—Staas & Halsey LLP

(57) ABSTRACT

An apparatus for efficient parallel executing instruction avoiding the usage of cross bypasses, the apparatus including an instruction buffer for storing instructions, of decoders for decoding, in parallel, the instructions which simultaneously issue from the instruction buffer, executing units for executing the instructions decoded in the decoders, and an instruction-issuing controlling means for controlling the issuing of the instructions in such a way that, when the instructions are executed, one of the plural executing units executes instructions more frequently than the rest of the plural executing units. The apparatus is preferably incorporated in an information processor to superscalar or out-of-order instruction execution.

12 Claims, 7 Drawing Sheets

FIG. 5

| INSTRUCTIONS | APPARATUS IN FIG. 6 | | APPARATUS IN FIG. 1 | |
|---|---|---|---|---|
| (1) | D1 | — | D1 | — |
| (2) | D2 | EXA | D2 | EXA |
| (3) | D3 | — | D0 | — |
| (4) | D0 | EXA | D1 | EXB |
| (5) | D1 | EXB | D2 | EXA |
| (6) | D2 | — | D0 | — |
| (7) | D3 | EXB | D1 | EXB |
| (8) | D0 | — | D0 | — |
| (9) | D1 | EXB | D1 | EXB |
| (10) | D2 | — | D2 | — |
| (11) | D3 | EXB | D0 | EXA |
| (12) | D0 | EXA | D0 | EXA |

APPARATUS AND METHOD FOR REALIZING EFFECTIVE PARALLEL EXECUTION OF INSTRUCTIONS IN AN INFORMATION PROCESSOR

BACKGROUND OF THE INVENTION

1. Field of the Invention

The present invention relates to an apparatus and a method for executing instructions, which instructions are provided to executing units incorporated in an information processor conforming to superscalar or out-of-order instruction execution.

2. Description of the Related Art

FIG. 6 of the accompanying drawings is a block diagram schematically showing a conventional apparatus for executing instructions, which apparatus is incorporated in a general information processor. The apparatus for executing instructions of FIG. 6 comprises instruction cache memory 1, instruction buffer (hereinafter called I-BUFFER where I represents "instruction") 2, instruction controller 3, decoding unit 4, reservation stations 5, executing units 6, result registers 7 and operand registers 8.

Instruction cache memory 1 copies and retains a part of instructions stored in the main memory.

I-BUFFER 2 temporarily stores a group of instructions (up to a maximum of 48 instructions), each fetched from instruction cache memory 1 in accordance with an instruction from instruction address creating section (see symbol 20 in accompanying drawing FIG. 1). I-BUFFER 2 further issues the stored instructions to downstream decoding unit 4 in accordance with instruction controller 3 to be described later.

Instruction controller 3 controls issuing of instructions from I-BUFFER 2 to decoding unit 4 by instructing I-BUFFER 2 to issue an instruction stored in I-BUFFER 2 to decoding unit 4. Since decoding unit 4 of the apparatus of FIG. 6 is divided into four decoders, instruction controller 3 instructs I-BUFFER 2 to simultaneously issue to decoding unit 4 four instructions, which is the maximum that decoding unit 4 can receive at one time. In order to take the fullest advantage of superscalar instruction execution, instruction controller 3 normally instructs I-BUFFER 2 such that I-BUFFER 2 issues instructions of the maximum number (four instructions in the apparatus of FIG. 6) that decoding unit 4 can receive at the same time while I-BUFFER 2 retains an instruction.

Decoding unit 4 is divided into four parts of decoders D0, D1, D2 and D3, which receive and decode, in parallel, instructions simultaneously issued from I-BUFFER 2. Upon receipt of an instruction from I-BUFFER 2, each decoder extracts an op-code that is a format to make an information processor (an apparatus for executing instructions) recognize the contents of the instruction and an operand to indicate the object of the instruction from the received instruction.

Two reservation stations 5 are named RSEA (reservation station for execution A) and RSEB (reservation station for execution B). Each of RSEA and RSEB stores up to a maximum of eight instructions that decoding unit 4 has decoded. Each decoded instruction is stored in RSEA or RSEB until the instruction is to be executed in executing unit 6. Upon completion of an arithmetic operation in executing unit 6 based on an instruction, the immediate subsequent instruction is sent to the same executing unit 6 for execution.

Two executing units 6 are named EXA (execution unit A) and EXB (execution unit B). EXA and EXB sequentially perform arithmetic operations on the basis of instructions stored in RSEA and RSEB, respectively. Results of such arithmetic operations are sent to result registers 7 downstream.

A result of an arithmetic operation by executing unit 6 (EXA or EXB) is written in result register 7 (indicated by "RR" in accompanying drawings) and one result register 7 is installed downstream of each executing unit 6.

When the cross bypasses which connect the two executing units 6 are not used whereupon a result of an arithmetic operation by executing unit 6 is input to the same executing unit 6 for a future arithmetic operation (that is, the result of an arithmetic operation performed by EXA is input to EXA, or the result of an arithmetic operation performed by EXB is input to EXB), the result obtained by executing unit 6 is written in the associated result register 7 and is immediately input to the same executing unit 6 through route 10 of FIG. 6 in order to be used for another arithmetic operation.

On the other hand, a cross bypass is used so that a result of an arithmetic operation performed by one executing unit 6 is input to the other executing unit 6 (that is, the result of an arithmetic operation performed by EXB is input to EXA, or the result of an arithmetic operation performed by EXA is input to EXB), the result obtained by the first-named executing unit 6 is written in the associated result register 7 and further in associated operand register 8 (indicated by OPR in accompanying drawings) through route 9 of FIG. 6 and, after that, is input to the other executing unit 6 in order to be used for another arithmetic operation.

Namely, when a cross bypass is used, a result of arithmetic operation by one executing unit 6 is temporarily written in operand register 8 through route 9 of FIG. 6 after being written in the associated result register 7 and then is sent to the other executing unit 6 to be used for another arithmetic operation.

Cross bypasses represent routes, through each of which a result of arithmetic operation obtained in one executing unit 6 is input to another executing unit 6 because the latter executing unit 6 requires the result in order to execute a future arithmetic operation. Cross bypasses are therefore routes 9 in FIG. 6.

Basically in the apparatus for executing instructions of FIG. 6, instructions decoded in decoder D0 or D2 are dispatched to and temporarily stored in RSEA and then output to EXA while instructions decoded in decoder D1 or D3 are dispatched to and temporarily stored in RSEB and then output to EXB. An instruction for a destination of branching is always decoded in decoder D0. Instruction controller 3 controls I-BUFFER 2 such that I-BUFFER 2 issues the maximum four instructions to decoders D0 through D3 (decoding unit 4) from I-BUFFER 2 as long as I-BUFFER 2 retains instructions.

Those skilled in the art conceive that I-BUFFER 2 should issue a maximum number of instructions that can be simultaneously issued in order to take the fullest advantage of superscalar instruction execution when a conventional method for executing instructions is performed. For that reason, the apparatus of FIG. 6, as described above, issues to decoding unit 4 a maximum number of instructions (four instructions in this apparatus) that can be issued at one time as long as I-BUFFER 2 retains instructions.

Further, the apparatus of FIG. 6 adopts split queuing which stores groups of instructions, each group being dedicated to one of executing units 6, before each of the instructions is executed by the dedicated executing units. At this time, if one executing unit 6 uses a result of an arithmetic operation performed by the other executing unit 6 for a future arithmetic operation (i.e., a cross bypass between executing units 6 is used), the result is input to the other executing unit 6 through result register 7 and operand register 8. As a consequence, the usage of a cross bypass requires a time period (i.e., a control time period; hereinafter called 1 τ) for transmitting a result through operand register 8 longer than that when one execution unit 6 uses the result obtained by the same executing unit 6 (i.e., when a cross bypass is not used for a future arithmetic operation) to complete the instruction execution.

Such usage of cross bypasses tends to occur when a maximum number of instructions that can be issued at the same time are issued and two executing units 6 execute instructions in parallel. Especially, the usage of cross bypasses during repetitious execution of a short loop containing over ten instructions increases the time period required to complete the repetitious execution because of an extra time length for transmitting a result obtained by one executing unit 6 to the other executing unit 6.

Detailed operations in which the cross bypasses between executing units 6 are used will now be described with reference to FIGS. 5 and 7.

The below group of instructions (1) through (12) is an example of a short loop which causes usage of cross bypasses.

Each field of the left side of table FIG. 5 represents one of decoders D0 through D3 (decoding unit 4), which decodes the instruction of the short loop indicated at the left side, and one of EXA and EXB (executing units 6), which executes the same instruction, in relation to the apparatus of FIG. 6. An instruction with a symbol "-" in FIG. 5 is processed without execution performed in executing units 6 (i.e., such an instruction is a load or branch instruction).

FIG. 7 shows a relationship of time (control time period τ) and each process of executing instructions in the short loop (instructions (1) through (12)) when the apparatus of FIG. 6 repeats the execution of the short loop three times. In FIG. 7, numbers in brackets on the left edge indicate the numbers of the instructions (1) to (12), and fields of the left-side column represent the contents of instructions each corresponding to instruction indicated by a number at its left. EXA or EXB (executing unit 6) in a bracket at each field of the left-side column executes the instruction in the same field. The numbers 1 through 40 indicate the passage of time (control time periodsτ).

The letters "p", "b", "a", "t", "m", "b", "r" and "x" represent operations (stages) in executing an instruction: "p" represents priority; "b", buffer; "a", address; "t", TLB/TAG; "m", match; "r", result; and "x", execute. Execution of an instruction undergoes one or more stages.

(1) lduh [% g2+% 14], % g2
(2) subcc % g2, % 10, % g0
(3) bleu,pn % icc, (pc+0x14)
(4) or % g0, % g2, % g5
(5) subcc % o3, % 0x1, % o3
(6) bne,pt % icc, (pc+0xffffe8c)
(7) add % g5, % 12, % o0
(8) ldub [% o0+% o2], % g2
(9) subcc % g2, % o7, % g0
(10) bne,pt % icc, (pc+0x154)
(11) and % g5, % 11, % g2
(12) sll % g2, 0x1, % g2

First of all, when executing of lduh (load) instruction (1) is started, the instruction is decoded in decoder D1 and waits for a value to be written in address % g2. Upon writing the value, data is loaded from address % g2+% 14 using the value in address % g2 and, after that, the loaded data is written in address % g2. The next subcc (subtraction) instruction (2) is decoded by decoder D2 and waits until the value is written in address % g2. Upon writing the value in address % g2, the subcc instruction (2) is executed by EXA, using the written value.

The third bleu (branch) instruction (3) is decoded by decoder D3, and the subsequent OR (logical sum) instruction (4), which is a delay slot instruction of bleu instruction (3), is decoded in decoder D0 thereby being executed in EXA after the execution of the fifth subcc (subtraction) instruction (5). Since the bleu instruction (3) assigns pn and does not branch, the subcc instruction (5) subsequent to the OR instruction (4) is decoded by decoder D1 and thereby executed by EXB.

bne (branch) instruction (6) is decoded by decoder D2 and add instruction (7), which is a delay slot instruction of the bne instruction (6), is decoded in decoder D3 and thereby executed in EXB. At that time, since the add instruction (7) utilizes the result of execution of the OR instruction (4), the cross bypass from EXA to EXB is used at control time period 8 τ, as shown in FIG. 7. The usage of the cross bypass occurs at control time period 20 τ during the second cycle of the execution of the short loop and at control time period 32 τ during the third cycle for the same reason.

lduh (load) instruction (8), which is an instruction for the destination of branching of the bne instruction (6), is executed, using the result of an arithmetic operation of the add instruction (7). Since the lduh instruction (8) is an instruction for the destination of branching of the bne instruction (6), the lduh instruction (8) is decoded by decoder D0. Data loaded from address % o0+% o2 during execution of the lduh instruction (8) is written in address % g2 at "r" stage. subcc (subtraction) instruction (9) subsequent to the lduh instruction (8) is decoded by decoder D1 and waits until the loaded data is written in address % g2 at the "r" stage of the lduh instruction (8) and, after that, is executed in EXB, using the written data.

While the subcc instruction (9) waits for the writing of the loaded data in address % g2, AND instruction (11), which is a delay slot instruction of bne (branch) instruction (10), and the subsequent sll instruction (12) are executed.

After the AND (logical product) instruction (11) is decoded by D3 and is executed by EXB, the sll instruction (12), which is the destination of the bne instruction (10), is decoded by decoder D0 and thereby executed by EXA. As mentioned above, since EXB executes AND instruction (11) and EXA, the sll instruction (12), the cross bypass from EXA to EXB is used at control time period 11 τ. The usage of the cross bypass due to the same reason occurs at control time period 23 τ during the second cycle of the execution of the short loop and at control time period 35 τ during the third cycle.

Upon execution of the sll instruction (12), the lduh instruction (1) again loads data from address % g2+% 14 using the result of the arithmetic operation of the sll instruction (12). The loaded data is written in address % g2, and then execution of subsequent instructions is repeated.

As shown in FIG. 7, the apparatus for executing instructions of FIG. 6 requires 12 τ control time periods to complete the execution of the entire short loop having instructions (1) through (12) once. During the one cycle execution, the usage of cross bypass occurs twice. The usage of the cross bypasses prevents the result obtained in one executing unit 6 from being immediately input to the other executing unit 6 thereby requiring a great-amount of extra time to complete instruction execution.

In order to avoid such usage of the cross bypasses, only one of two execution units 6 may execute instructions. This definitely avoids the usage of the cross bypasses, however the instruction execution takes a longer time than that allowing the usage of the cross bypasses because parallel execution is not performed in this instruction execution. Parallel instruction execution which can prevent the cross bypass from being used has been demanded in order to shorten the time required for the instruction execution.

SUMMARY OF THE INVENTION

With the foregoing problems in view, it is an object of the present invention to provide an apparatus and a method for executing instructions that realizes effective parallel execution, inhibiting cross bypasses from being used, in order to reduce the time required for instruction execution.

To attain the above object, as a first generic feature of the present invention, there is provided an apparatus for executing instructions comprising: an instruction buffer for storing instructions; a number of decoders for decoding, in parallel, the instructions which simultaneously issue from the instruction buffer; a plurality of executing units for executing the instructions decoded in the decoders; and an instruction-issuing controlling means for controlling the issuing of the instructions in such a way that, when the instructions are executed, one of the plural executing units executes instructions more frequently than the rest of the plural executing units.

As a preferable feature, each of the plural executing units may be associated with two or more of the decoders so that each of the executing units can execute instructions decoded by the associated two or more decoders; and the instruction-issuing controlling means may perform the controlling by inhibiting issuing of the instructions from the instruction buffer to at least one of the associated two or more decoders of each of the rest of the plural executing units.

As another preferable feature, the apparatus may comprise detecting means for detecting a state that cross bypasses, through each which a result of executing of an instruction by one of the plural executing units is input to another one of the plural executing units, are frequently used, and if the detecting means detects a state that the cross bypasses are frequently used, the instruction-issuing controlling means may be activated.

As a second generic feature of the present invention, there is provided a method for executing instructions comprising the steps of: (a) storing instructions in an instruction buffer; (b) simultaneously issuing the instructions from the instruction buffer to a number of decoders; at the decoders (c) decoding, in parallel, the instructions issued from the instruction buffer; and at a plurality of executing units (d) executing the instructions decoded in the decoders, if predetermined conditions are fulfilled, the step (b) of issuing instructions being performed in such a way that, at the step (d) of executing instructions, one of the plural executing units executes instructions more frequently than the rest of the plural executing units.

As a preferable feature, each of the plural executing units may be associated with two or more of the decoders so that, at the step (d) of executing instructions, each of the plural executing units is operable to execute instructions decoded by the associated two or more decoders; and the step (b) of issuing instruction may include the step of, if the predetermined conditions are fulfilled, inhibiting issuing of the instructions from the instruction buffer to at least one of the associated two or more decoders of each of the rest of the plural executing units.

The apparatus and the method of executing instructions according to the present invention controls issuing of instructions from the instruction buffer to decoders whereupon one executing unit executes instructions more frequently than the rest of all executing units while, however, each of all executing units executes at least one instruction. Under the control, there is a high possibility that a result of an instruction that has been executed by one executing unit is input to the same executing unit to be used for a future execution of an instruction. As a result, it is therefore possible to realize efficient parallel execution of instructions, preventing the cross bypasses from being frequently used whereupon the time required to complete instruction execution can be shortened.

Especially, when a state in which the cross bypasses are frequently used, that is, a state in which the apparatus repeats execution of a short loop which causes the usage of the cross bypasses, is detected, issuing of instructions to decoders is controlled in such a way that one executing unit executes instructions more frequently than the rest of the executing units. Such controlling surely reduces the time length required to execute instructions by effectively preventing each cross bypass from being used.

Controlling such that one executing unit executes instructions more frequently than the rest of the execution units can be carried out simply by inhibiting issuing instructions from the instruction buffer to one or more decoders among decoders associated with each of the rest of the executing units. As a consequence, it is possible to prevent the cross bypasses from being used with ease.

If the reservation station stores instructions equal to or more than a predetermined threshold value, the issuing of the instructions is controlled; on the other hand, if the reservation station stores instructions less than the predetermined threshold value, the issuing of the instruction issued is not controlled in order to increase instructions to be dispatched to the reservation station. As a result, such occasional restriction surely prevents idleness (a state in which an executing unit executes no instructions) of each executing unit.

If predetermined cancellation conditions (e.g., the passage of a predetermined amount of time, or completion of execution of a predetermined number of instructions) are fulfilled after the control over the issuing instructions starts, the control over the issuing is canceled. The cancellation causes all executing units to equally execute instructions as a normal state, in which every one of the executing units does not execute instructions more frequently than the rest of the executing units thereby realizing further efficient execution of instructions.

Other objects and further features of the present invention will be apparent from the following detailed description when read in conjunction with the accompanying drawings.

BRIEF DESCRIPTION OF THE DRAWINGS

FIG. 5 is a table showing combinations of a decoder that decodes each instruction in the short-loop and an executing unit executes the same instruction decoded by the associated decoder, which decoder and executing unit are in the apparatus of FIG. 1 or 6;

DESCRIPTION OF THE PREFERRED EMBODIMENTS

A preferred embodiment of the present invention will now be described with reference to the accompanying drawings.

Figure 1:
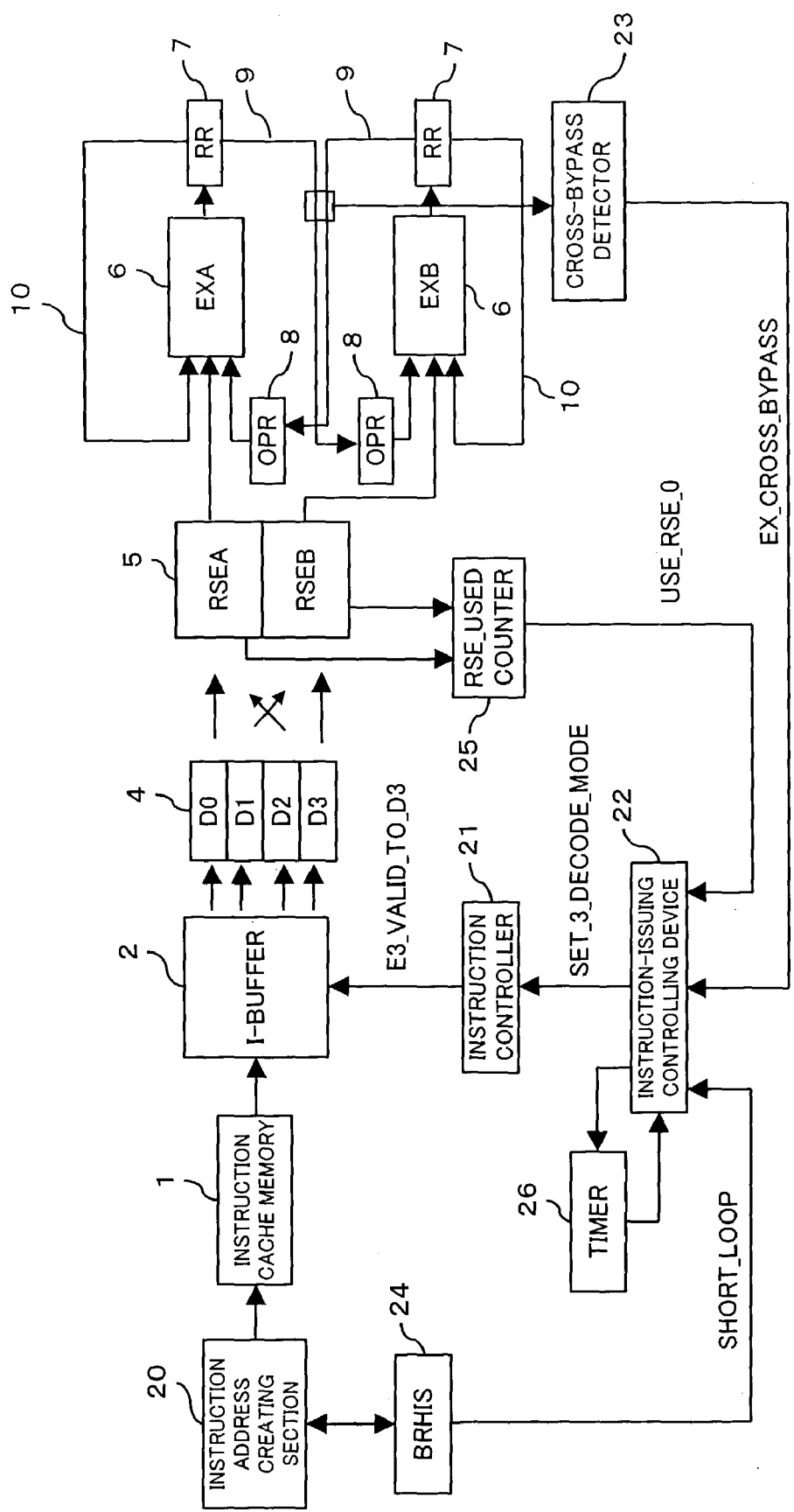
FIG. 1 is a block diagram schematically showing an apparatus for executing instructions according to a first embodiment of the present invention.
Figure 2:
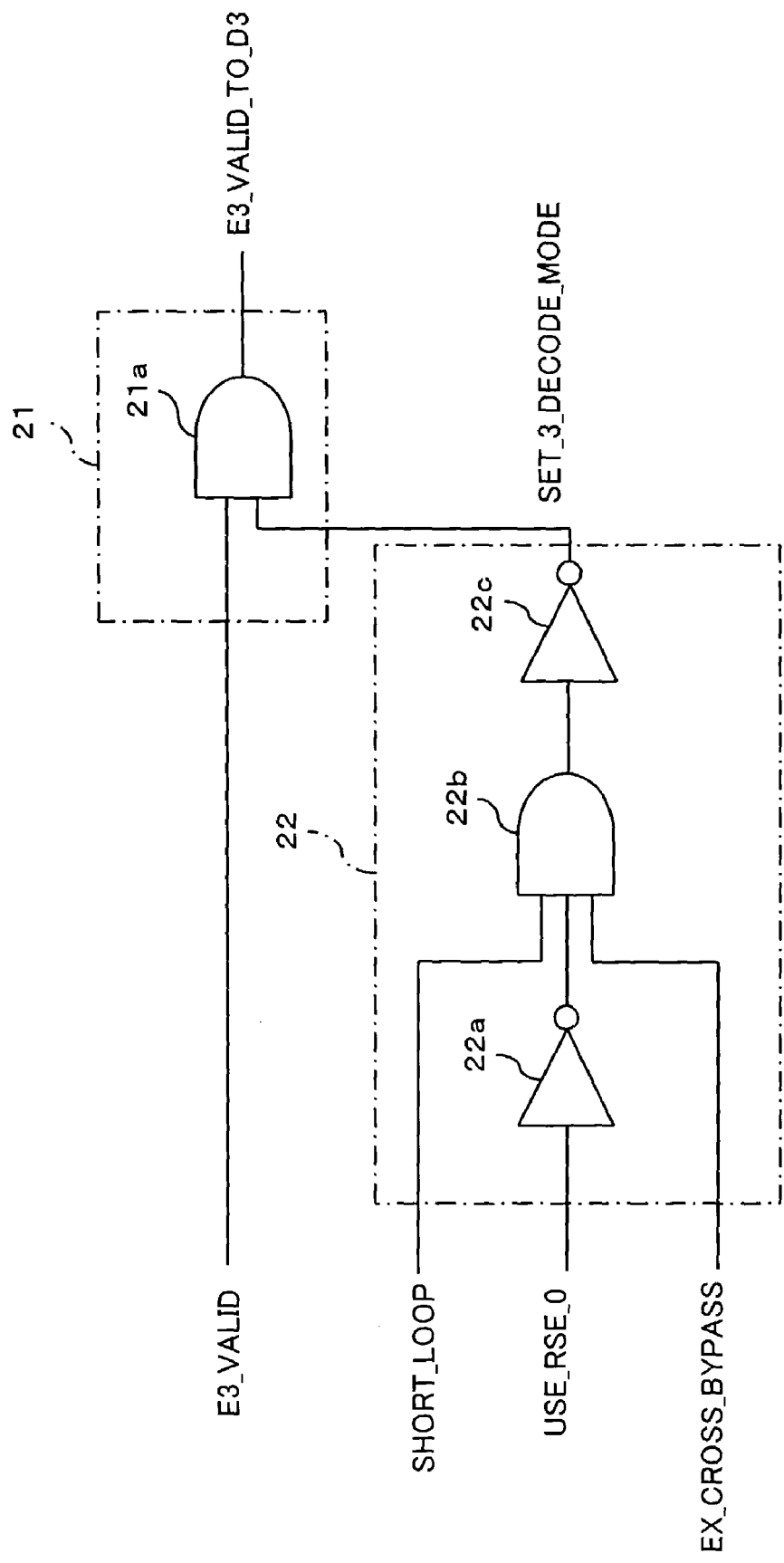
FIG. 2 is a block diagram schematically showing details of the apparatus of FIG. 1, focusing on instruction-issuing controlling device and instruction controller.

(A) First Embodiment:

FIG. 1 is a block diagram schematically showing an apparatus for executing instructions according to a first embodiment of the present invention; and FIG. 2 is a block diagram schematically showing details of the apparatus of FIG. 1, focusing on the instruction-issuing controlling device and instruction controller.

Figure 6:
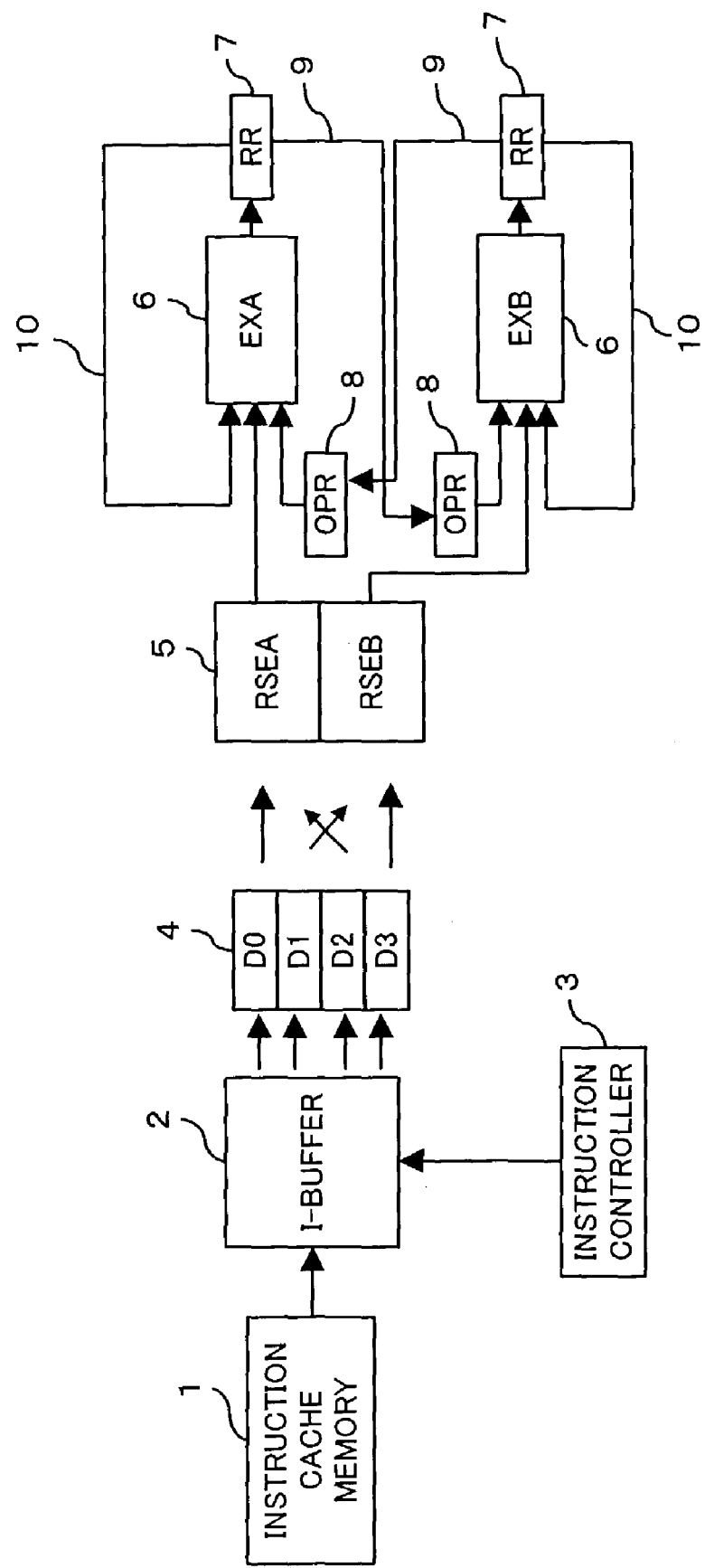
FIG. 6 is a block diagram schematically showing a conventional apparatus for executing instructions.

The apparatus for executing instructions of FIG. 1 is incorporated in an information processor and comprises, similar to the apparatus of FIG. 6, instruction cache memory 1, instruction-buffer 2, decoding unit 4, reservation stations 5, executing units (EXA and EXB) 6, result registers 7 and operand registers 8. In addition to the above elements, the apparatus of FIG. 1 includes instruction address creating section 20, instruction controller 21, instruction-issuing controlling device 22, cross-bypass detector 23, branch history storage (hereinafter BRHIS) 24, RSE_USED counter 25 and timer 26. Reference numbers of FIG. 1 which are identical to those already referred to indicate elements identical or substantially identical to the referred elements, so any repetitious description is omitted here.

Instruction address creating section 20 creates an instruction address and fetches an instruction from instruction cache memory 1. Instruction buffer (hereinafter called I-BUFFER) 2 temporarily stores a group of instructions (up to a maximum of 48 instructions), each fetched from instruction cache memory 1 in accordance with an instruction address created by instruction address creating section 20. I-BUFFER 2 further issues the stored group of instructions to downstream decoding unit 4 in accordance with instructions from instruction controller 21 to be described later.

Instruction controller 21, identical to instruction controller 3 of FIG. 6, controls issuing of instructions from I-BUFFER 2 to decoding unit 4 by instructing I-BUFFER 2 to issue an instruction stored in I-BUFFER 2 to decoding unit 4. In the illustrated example, decoding unit 4 is divided into four parts (D0 through D3, hereinafter the parts are called decoders D0 through D3) whereupon instruction controller 21 normally instructs I-BUFFER 2 such that I-BUFFER 2 issues instructions of the maximum number (four instructions in the illustrated example) that decoding unit 4 can receive at the same time.

Instruction controller 21 of the illustrated embodiment also inhibits I-BUFFER 2 from issuing instructions to decoder D3 by following an instruction (signal SET_3_DECODE_MODE) received from later-described instruction-issuing controlling device 22. In order to realize such a function, instruction controller 21 includes AND gate 21a as shown in FIG. 2. AND gate 21a determines a logical product of SET_3_DECODE_MODE from instruction-issuing controlling device 22 and signal E3_VALID, which enables I-BUFFER 2 to issue an instruction to decoder D3, and further issues the determined logical product (signal E3_VALID_TO_D3), as an instruction to I-BUFFER 2.

Specifically, signal SET_3_DECODE_MODE from instruction-issuing controlling device 22 is ordinarily set to "1". The other signal of E3_VALID that enables I-BUFFER 2 to issue an instruction to decoder D3 and that is usually issued from instruction controller 21 passes through AND gate 21a. At that time, an output E3_VALID_TO_D3 of AND gate 21a is "1" so that I-BUFFER 2 issues an instruction to decoder D3 as a usual practice. On the other hand, if signal SET_3_DECODE_MODE from instruction-issuing controlling device 22 is set to "0" as described later, signal E3_VALID does not pass through AND gate 21a so that an output E3_VALID_TO_D3 of AND gate 21a becomes "0". As a result, I-BUFFER 2 is inhibited from issuing an instruction to decoder D3.

Instruction-issuing controlling device (instruction-issuing controlling means) 22 controls the number of instructions to be issued to each of four decoders D0 through D3 from I-BUFFER 2 in such a way that one of two executing units 6 (in this example, EXA) executes instructions more frequently than the remaining executing unit 6 (the rest of two executing units 6) while the remaining executing unit (EXB) 6 executes at least one instruction.

In the illustrated embodiment likewise the apparatus of FIG. 6, instructions decoded in decoder D0 or D2 are dispatched to and temporarily stored in reservation station A (RSEA) and then output to EXA while instructions decoded in decoder D1 or D3 are dispatched to and temporarily stored in reservation station B (RSEB) and then output to EXB. Namely, the relationship between decoders and one of executing units 6, which executes instructions decoded in each of the decoders, is predetermined. In the illustrated example, each one of executing units 6 is associated with two of decoders D0 through D3 (i.e., EXA corresponds to decoder D0 and D2; and EXB, to decoder D1 and D3). Also in this embodiment, an instruction for a destination of branching is always decoded in decoder D0.

If a state in which at least one of the cross bypasses is frequently used is detected, instruction-issuing controlling device 22 is activated in order to change signal SET_3_DECODE_MODE that is to be output to instruction controller 21 from "1" to "0", as described later. Whereupon instruction-issuing controlling device 22 inhibits I-BUFFER 2 from issuing instructions to one (in this case, decoder D3) of decoders D0 and D3, which are associated with EXB other than EXA that executes instructions more frequently. This inhibiting restricts the number of instructions to be issued to decoding unit 4 from I-BUFFER 2.

Changing of the value of signal SET_3_DECODE_MODE is carried out by inverters 22a and 22c and AND gate 22b, which are incorporated in instruction-issuing controlling device 22, as described later with reference to FIG. 2. While the normal state that a stat in which each cross bypass is frequently used is not detected, signal SET_3_DECODE_MODE that instruction-issuing controlling device 22 outputs to instruction controller 21 remains "1". In such a normal state, instruction-issuing controlling device 22 controls I-BUFFER 2 such that four instructions simultaneously issue to four decoders D0 to D3 from I-BUFFER 2, similar to the apparatus of FIG. 6, as long as I-BUFFER 2 stores sufficient instructions. At that time, the number of instructions to be issued to at least one of decoders D0 to D3 is of course not inhibited.

As mentioned above, instruction-issuing controlling device 22 is activated when a state in which at least one of the cross bypasses is frequently used is detected. Such detection is carried out by cross-bypass detector 23 and BRHIS 24 included in the apparatus of FIG. 1.

Cross-bypass detector (cross-bypass detecting means) 23 monitors whether or not a signal passes through each route (cross bypass) 9 and, if cross-bypass detector 23 detects the passage of a signal through one of routes 9, determines that at least one of the cross bypasses is used and notifies instruction issuing controlling device 22 of the detection result that at least one of the cross bypasses by changing signal EX_CROSS_BYPASS from "0" to "1 ".

BRHIS (branch history storage) 24 serves to function as loop detecting means to detect a loop that is a set of predetermined-instructions to be repeatedly executed. BRHIS 24 stores and retains a history of branch instructions and detects a short loop based on a retained history. A short loop represents a group of instructions, all of which instruction cache memory 1 can retain at the same time, and instructions of a short loop are repeatedly performed in such a way that execution of the last instruction causes the first instruction to be executed.

Especially, BRHIS 24 of the illustrated embodiment includes a non-illustrated counter that counts the number of branch instructions. With the counter, the detection of branching at the same address 16 times, for example, causes BRHIS 24 to determine the presence of a short loop whereupon BRHIS 24 notifies instruction-issuing controlling device 22 of the detection of the shortloop by changing signal SHORT_LOOP from "0" to "1".

RSE_USED counter (counter) 25 counts the number of instructions retained in each reservation station 5 (RSEA and RSEB, respectively) in order to notify instruction-issuing controlling device 22 of the number of instructions stored in reservation stations 5 by means of signal USE_RSE_0. When reservation stations 5 retain no instruction, signal USE_RSE_0 indicates "1"; and when at least one of reservation stations 5 retains one or more instructions, signal USE_RSE_0 indicates "0".

If a relatively small number of instructions are utilizing reservation stations 5 (i.e., instructions stored in reservation stations 5), executing units 6 may not perform an arithmetic operation for some length of time because of a shortage of instructions. In order to avoid such idleness of execution units 6 at that time, more instructions need to be dispatched to reservation stations 5 without restricting the number of instructions to be dispatched to each reservation station 5.

As a solution, when reservation stations 5 retain instructions equal to or more than a predetermined number (a threshold value; one in the illustrated embodiment), instruction-issuing controlling device 22 is activated. On the other hand, when reservation stations 5 retain no instruction, instruction-issuing controlling device 22 is not activated so as not to restrict the number of the instructions to be issued to each reservation station 5. Whereupon the number of instructions to be dispatched to each reservation station 5 increases.

As shown in FIG. 2, instruction-issuing controlling device 22 includes inverters 22a and 22c and AND gate 22b.

Inverter 22a inverts signal USE_RSE_0 from RSE_USED counter 25 and outputs the result of the inverting; AND gate 22b outputs a logical product of signal SHORT_LOOP from BRHIS 24, an output of inverter 22a and signal EX_CROSS_BYPASS from cross-bypass detector 23; and inverter 22c inverts an output of AND gate 22b and outputs the result of inverting to AND gate 21a included in instruction controller 21 which result is in the form of signal SET_3_DECODE_MODE.

When a short loop and the fact that at least one of the cross bypasses is used are detected at the same time (i.e., a state that the cross bypasses are frequently used is detected) and at least one reservation station 5 is detected to be retaining one or more instructions, signal SHORT_LOOP from BRHIS 24 and signal EX_CROSS_BYPASS from cross-bypass detector 23 are set to "1" and signal RSE_USED from RSE_USED counter 25 is set to "0" in the first embodiment. Accordingly, instruction-issuing controlling device 22 is activated and changes signal SET_3_DECODE_MODE, which is output to instruction controller 21, from "1" to "0" so that instruction controller 21 inhibits I-BUFFER 2 from issuing instructions to decoder D3.

If the apparatus for executing instructions of FIG. 1, which apparatus is incorporated in an information processor, simultaneously detects a short loop, the usage of at least one of the cross bypasses and one or more instructions retained in reservation stations 5 in relation to a program (a group of instructions) being executed, the number of instructions issued to decoding unit 4 at one time is restricted from "4" to "3".

Further in the illustrated embodiment, if predetermined cancellation conditions are fulfilled after instruction-issuing controlling device 22 is activated, controlling (restriction) performed by instruction-issuing controlling device 22 is cancelled. Cancellation of the controlling is carried out by a canceling function (canceling means) included in instruction-issuing controlling device 22. The time when the controlling is canceled is determined with reference to a predetermined amount of time measured by timer 26.

Timer 26 measures the length of time that passes after a signal to control issuing of instructions to decoding unit 4 (in other words, after instruction-issuing controlling device 22 is activated and signal SET_3_DECODE_MODE is changed from "1" to "0").

When the length of time measured by timer 26 reaches a predetermined amount, the canceling function causes instruction-issuing controlling device 22 to send instruction controller 21 a signal to disable the controlling over issuing of instructions to decoding unit 4. Specifically, signal SET_3_DECODE_MODE is changed from "0" to "1" thereby canceling the restriction on the number of instructions to be issued to decoding unit 4.

Figure 3:
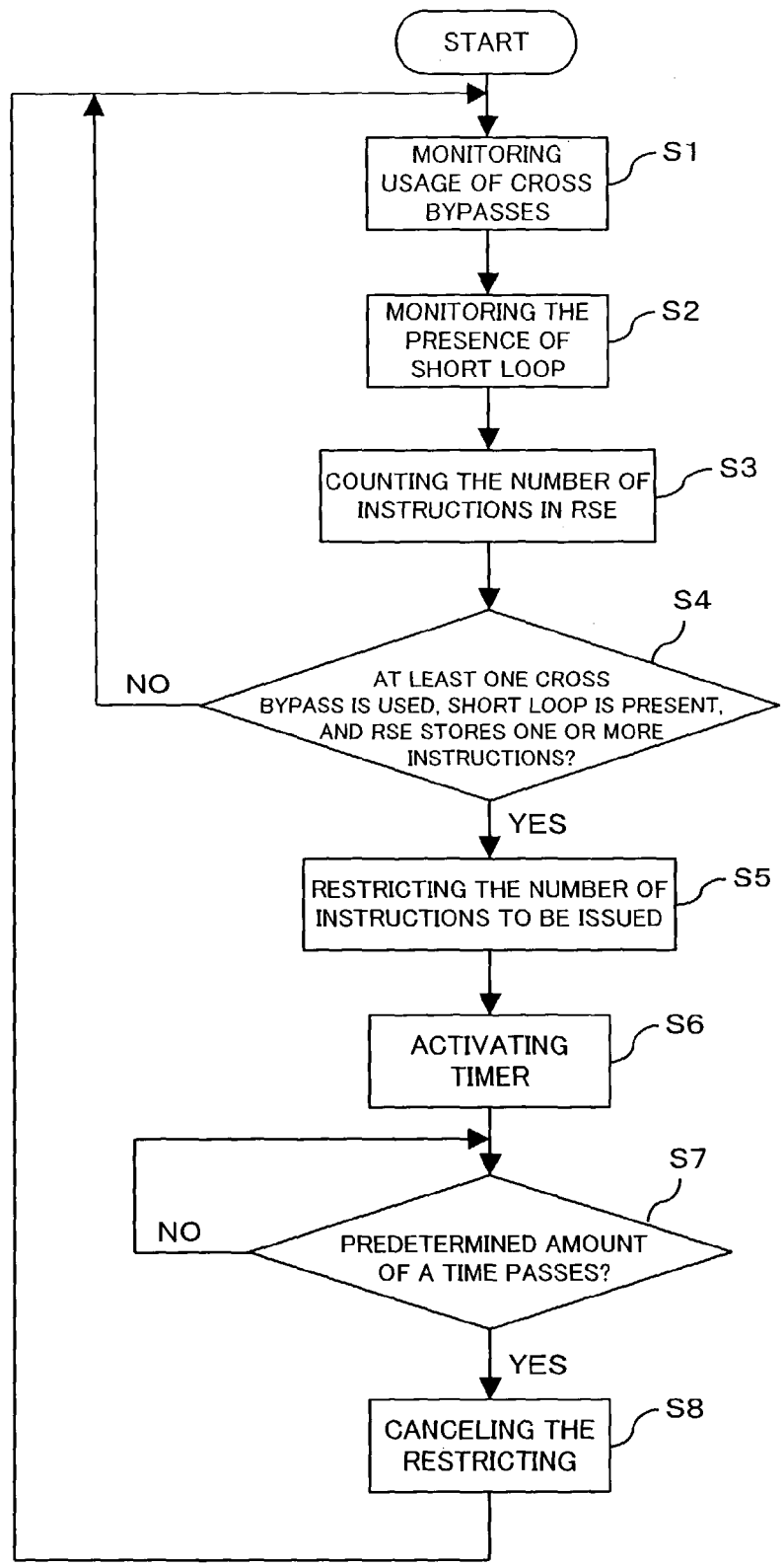
FIG. 3 is a flow diagram illustrating a succession of procedural steps performed by the instruction-issuing controlling device of FIG. 1.

A succession of procedural steps (Steps S1 to S8) performed by apparatus for executing instruction (instruction-issuing controlling device 22) of the present embodiment will now be described with reference to flow diagram FIG. 3.

Upon starting executing instructions by the apparatus, cross-bypass detector 23 starts continuous monitoring whether or not each cross bypass issued (Step S1), BRHIS 24 also starts continuous monitoring whether or not a short-loop is present (Step S2), and RSE_USED counter 25 counts the number of instructions currently retained in each reservation station 5 (Step S3).

When a short loop and the usage of at least one of the cross bypasses are detected at the same time and at least one reservation station 5 is detected to be retaining one or more instructions (YES route in Step S4), instruction-issuing controlling device 22 is activated and issuing of instructions to decoder D3 is inhibited by restricting the maximum number of instructions simultaneously issued to decoding unit 4 to "3" from "4" (Step S5). As a result, one (EXA) of two executing units 6 executes instructions more frequently than the other executing unit 6 (EXB) while both of two executing units 6 execute one or more instructions.

At the same time when the control over the number of instructions to be issued to decoding unit 4 is started, timer 26 is also activated so that the length of time that passes after the start of the controlling is measured (Step S6).

When the length of a time measured by timer 26 reaches the predetermined amount (or the end of the execution of the short loop is detected: YES route in Step S7), the canceling function of instruction-issuing controlling device 22 cancels the control over the number of instructions to be issued (Step S8) and the procedural steps return to Step S1.

Next, detailed operations performed by the apparatus for executing instructions of the present embodiment will now be described with reference to FIGS. 4 and 5. Especially, the detailed operations are exemplified by executing the above-mentioned group of instructions (1) through (12) (a short loop that causes the frequent usage of the cross bypasses) under the control over the number of instructions to be simultaneously issued.

Each field of the right side of table FIG. 5 represents one of decoders D0 through D3 (decoding unit 4), which decodes the instructions of the short loop indicated at the left side, and one of EXA and EXB (executing units 6), which executes the same instruction, in relation to the apparatus of FIG. 1. An instruction with a symbol "-" in FIG. 5 is processed without execution performed in executing units 6 (i.e., such an instruction is a load or branch instruction).

Figure 4:
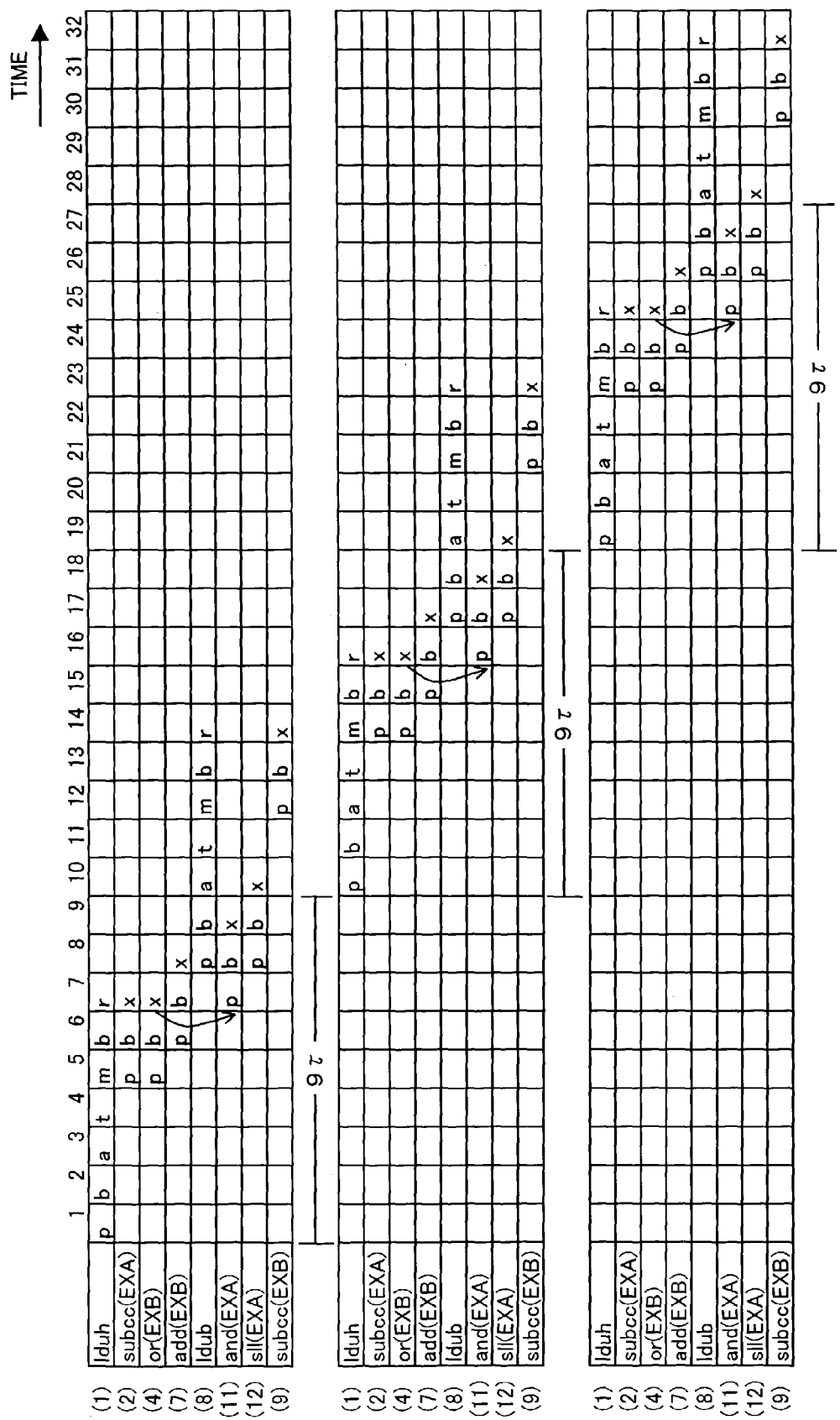
FIG. 4 is a diagram showing a relationship between time and processes of executing instructions in a short-loop while the short-loop repeats three times in the apparatus of FIG. 1.

FIG. 4 shows a relationship between time (control time period τ) and each process of executing instructions in the short loop (instructions (1) through (12)) when the apparatus of FIG. 1 repeats the execution of the short loop three times, controlling over the number of instructions to be issued at the same time. In FIG. 4, similar to FIG. 7, numeric numbers in brackets on the left edge indicate the numbers of the instructions (1) to (12), and fields of the left-side column represent the contents of instructions each corresponding to an instruction indicated by a number at its left. EXA or EXB (executing unit 6) in a bracket at each field of the left-side column executes the instruction in the same field. The numbers 1 through 32 indicate the passage of time (control time periods τ). The letters "p", "b", "a", "t", "m", "b", "r" and "x" represent operations (stages) in executing an instruction: "p" represents priority; "b", buffer; "a", address; "t", TLB/TAG; "m", match; "r", result; and "x", execute. Execution of an instruction undergoes one or more stages.

First of all, when executing of lduh (load) instruction (1) is started, the instruction is decoded in decoder D1 and waits for a value to be written in address % g2. Upon writing the value, data is loaded from address % g2+% l4 using the value in address % g2 and, after that, the loaded data is written in address % g2. The next subcc (subtraction) instruction (2) is decoded by decoder D2 and waits until the value is written in address % g2. Upon writing the value in address % g2, the subcc instruction (2) is executed by EXA, using the written value.

The third bleu (branch) instruction (3) is decoded by decoder D0, and the subsequent OR (logical sum) instruction (4), which is a delay slot instruction of bleu instruction (3), is decoded in decoder D1 thereby being executed in EXB. The OR instruction (4) uses a value in address % g0, which value is always "0", and the fifth subcc (subtraction) instruction (5) does not depend on the OR instruction (4) whereupon the subcc instruction (5) is executed at the same time as the execution of the OR instruction (4). At that time, since the bleu instruction (3) assigns pn and does not branch, the subcc instruction (5) subsequent to the OR instruction (4) is decoded by decoder D2 thereby being executed by EXA. bne (branch) instruction (6). is decoded by decoder D0 and add instruction (7), which is a delay slot instruction of the bne instruction (6), is decoded in decoder D1 thereby being executed in EXB. lduh (load) instruction (8), which is an instruction for the destination of branching of the bne instruction (6), is executed, using the result of an arithmetic operation of the add instruction (7). Since the lduh instruction (8) is an instruction for the destination of branching of the bne instruction (6), the lduh instruction (8) is decoded by decoder D0. Data loaded from address % o0+% o2 during execution of the lduh instruction (8) is written in address % g2 at "r" stage. subcc (subtraction) instruction (9) subsequent to the lduh instruction (8) is decoded by decoder D1 and waits until the loaded data is written in address % g2 at the "r" stage of the lduh instruction (8) and, after that, is executed in EXB, using the written data.

While the subcc instruction (9) waits for the writing of the loaded data in address % g2, AND instruction (11), which is a delay slot instruction of bne (branch) instruction (10), and sll instruction (12) subsequent to AND instruction (11) are executed. The bne instruction (10) is decoded by decoder D2. At that time, since the AND instruction (11) requires the result of an arithmetic operation of the OR instruction (4), which has been executed in EXB, and EXA carries out the execution of the AND instruction (11), the cross bypass from EXB to EXA, as shown in FIG. 4, is used at control time period 7 τ. The usage of the cross bypass occurs at control time period 16 τ in the second-time execution of the short loop and at control time period 25 τ in the third time execution due to execution of the AND instruction (11).

After the AND (logical product) instruction (11) is decoded by D0 and is executed by EXA, the sll instruction (12), which is the destination of the bne instruction (10), is decoded by decoder D0 thereby being executed by EXA. As mentioned above, since EXA executes both AND instruction (11) and the sll instruction (12), the cross bypasses are not used at control time periods 11 τ, 23 τ and 35 τ, at which a conventional apparatus uses the cross bypasses as shown in FIG. 7.

Upon execution of the sll instruction (12), the lduh instruction (1) again loads data from address % g2+% l4 using the result of the arithmetic operation of the sll instruction (12). The loaded data is written in address % g2, and then execution of subsequent instructions is repeated.

As shown in FIG. 4, the apparatus for executing instructions of FIG. 1 requires 9 τ control time periods to complete the execution of the entire short loop having instructions (1) through (12) once. During the one-time execution, the usage of a cross bypass occurs once. Namely, the apparatus of the present embodiment makes EXA execute instructions more frequently than EXB whereupon the number of times the cross bypasses are used during the execution is reduced. That shortens the length of time required to execute the short loop.

Figure 7:
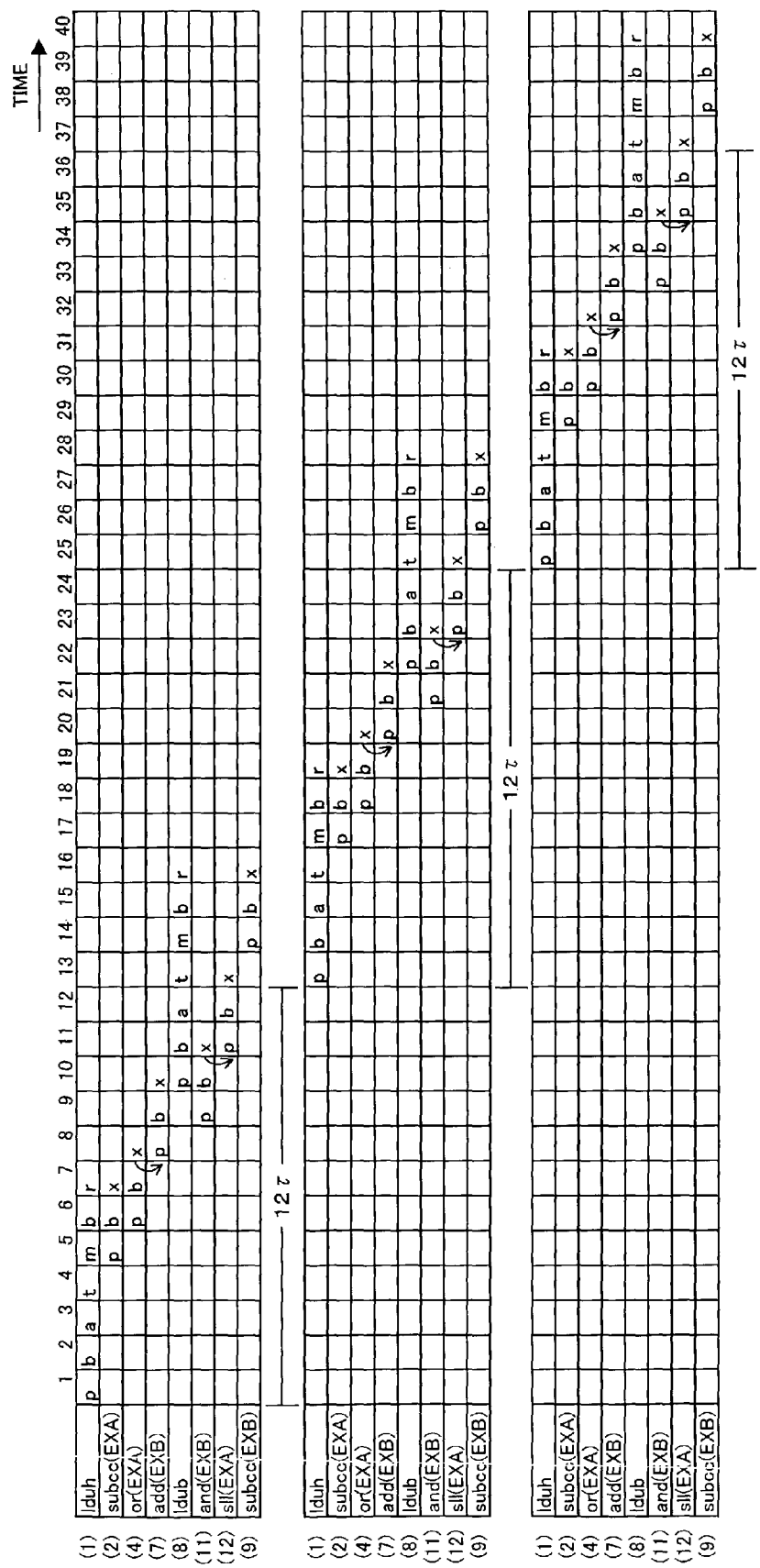
FIG. 7 is a diagram showing a relationship of time and processes of executing instructions in the short-loop while the short-loop repeats three times in the conventional apparatus of FIG. 6.

Further, the conventional apparatus for executing instructions of FIG. 6 executes the subcc instruction (2) and the OR instruction (4) in EXA and the two instructions cannot therefore be executed at the same time, as shown in FIG. 7. Conversely, the apparatus of the illustrated embodiment causes, as shown in FIG. 4, EXA and EXB to execute the subcc instruction (2) and the OR instruction (4), respectively, in parallel. This can further shorten the time required to execute the short loop.

As mentioned above, the apparatus of executing instructions according to the first embodiment restricts the number of instructions to be issued to decoding unit 4 (decoders D0 through D3) whereupon EXA executes instructions more frequently than the rest of all executing units 6 (i.e., EXB) while, however, each of all executing units 6 executes one or more instructions. As a result, there is a higher possibility that a result of an instruction that has been executed by EXA is used in a future execution of an instruction that the same EXA performs than the execution carried out in the conventional apparatus of FIG. 6. It is therefore possible to realize efficient parallel execution of instructions, preventing the cross bypasses from being frequently used.

Especially, when cross-bypass detector 23 and BRHIS 24 detect a state in which at least one of the cross bypasses is frequently used, that is, a state in which the apparatus repeats execution of a short loop which causes the frequent usage of the cross-bypasses, instruction-issuing controlling device 22 controls issuing of instructions to each of decoders D0 to D3 in such a way that EXA executes instructions more frequently than EXB. Such controlling by instruction-issuing controlling device 22 surely reduces the time length required to execute instructions by effectively preventing each cross bypass from being used.

Controlling such that EXA executes instructions more frequently than EXB can be carried out simply by inhibiting issuing instructions from I-BUFFER 2 to decoder D3, which is one from the two decoders (i.e., decoders D1 and D3) associated with each of all executing units 6 executes one or more instructions. As a consequence, it is possible to prevent the cross bypasses from being used with ease.

In the first embodiment, if reservation stations 5 store instructions equal to or more than a predetermined number (in the illustrated example, the predetermined number is "1"), the number of instructions to be issued to each of decoders D0 to D3 is restricted; on the other hand, if reservation stations 5 store fewer instructions than the predetermined number (in this example, i.e., stores no instructions), the restriction on the number of instructions issued is not carried out in order to increase instructions to be dispatched to reservation stations 5. As a result, such occasional restriction surely prevents idleness (a state in which executing unit 6 executes no instructions) of each executing unit 6.

During execution of instructions, a state in which the cross bypasses are frequently used does not continue for a long time. Therefore, if control over issuing of instructions such that EXA executes instructions more frequently than EXB continues for a long time, the execution of instructions worsens because effective parallel operation cannot be performed even if the frequent usage of the cross bypasses is avoided. As a solution for the illustrated embodiment, if predetermined cancellation conditions (e.g., the passage of a predetermined amount of time, completion of execution of a predetermined number of instructions, or completion of execution of a short loop) are fulfilled after control over issuing instructions to each of the decoders starts, the restriction over the issuing is canceled. The cancellation causes all executing units 6 (EXA and EXB) to execute instructions equally as a normal state, in which either one of the executing units 6 does not execute instructions more frequently than the rest of the executing units 6 thereby realizing further efficient execution of instructions.

(B) Others:

The present invention should by no means be limited to this foregoing embodiment, and various changes or modifications may be suggested without departing from the gist of the invention.

The apparatus for executing instructions according to the first embodiment comprises four divisions of decoding unit 4, two reservation stations 5, and two executing units 6. The number of each of divisions of decoding unit 4, reservation stations 5, and executing units 6 should by no means be limited to the foregoing embodiment.

In the illustrated example, control over issuing of instructions to each decoder is canceled when a predetermined amount of a time passes after controlling starts. The cancellation conditions should by no means be limited to the passage of the predetermined amount of time. As an alternative, the completion of execution of a short loop may be detected and the controlling may be cancelled when the short loop is detected.

A group of instructions executed by the apparatus of the first embodiment is exemplified by the above-mentioned short loop having the instructions (1) to (12). A group of instructions to be executed should by no means be limited to the example.

In the foregoing example, the controlling is carried out such that EXA executes instructions more frequently than EXB. Alternatively, issuing of instructions to one of decoders D0 and D2, which dispatches instructions to EXA, may be restricted so that EXB executes instructions more frequently than EXA. This accomplishes identical results to the foregoing embodiment.

What is claimed is:

1. An apparatus for executing instructions comprising:
   an instruction buffer storing instructions;
   a number of decoders decoding, in parallel, said instructions which are simultaneously issued from said instruction buffer;
   a plurality of executing units executing said instructions decoded in said decoders;
   instruction-issuing controlling means for restricting the number of instructions to be issued to the decoders in such a way that, while said instructions are executed by the plurality of said executing units, one of said plural executing units executes instructions more frequently than the rest of said plural executing units without halting operation of said plurality of said executing units;
   canceling means for canceling, when predetermined cancellation conditions are fulfilled after said instruction-issuing controlling means is activated, the controlling performed by said instruction-issuing controlling means; and
   a timer measuring the length of time that passes after the activation of said instruction-issuing controlling means,
   wherein if the length of time measured by said timer reaches a predetermined amount, said canceling means cancels the controlling performed by said instruction-issuing controlling means.

2. An apparatus for executing instructions according to claim 1, wherein
   each of said plural executing units is associated with two or more of said decoders so that each said executing unit is operable to execute instructions decoded by said associated two or more decoders, and
   said instruction-issuing controlling means performs the restricting by inhibiting issuing of said instructions from said instruction buffer to at least one of said associated two or more decoders of each of the rest of said plurality of executing units.

3. An apparatus for executing instructions according to claim 1, further comprising detecting means for detecting a state in which cross bypasses, through each of which a result of executing an instruction by one of said plurality of executing units is input to another one of said plurality of executing units, are frequently used, wherein if said detecting means detects a state in which the cross bypasses are frequently used, said instruction-issuing controlling means is activated.

4. An apparatus for executing instructions according to claim 3, wherein said detecting means includes cross-bypass detecting means for detecting whether or not each of the cross bypasses is used and loop detecting means for detecting a loop that is a set of predetermined instructions to be repeatedly executed, and if said cross-bypass detecting means detects that at least one of the cross bypasses is used and at the same time said loop detecting means detects a loop, said instruction-issuing controlling means is activated.

5. An apparatus for executing instructions according to claim 4, wherein said loop detecting means performs the detecting of a loop based on a history of one or more branch instructions included in said first-named instructions.

6. An apparatus for executing instructions according to claim 1, further comprising:

a reservation station temporarily storing said instructions decoded by said decoders before said instructions are dispatched to said plural executing units; and a counter counting the number of instructions currently stored in said reservation station, wherein if the result of the counting by said counter is equal to or larger than a predetermined threshold value, said instruction-issuing controlling means is activated.

7. A method for executing instructions comprising:

storing instructions in an instruction buffer;

simultaneously issuing the instructions from the instruction buffer to a number of decoders;

decoding, in parallel, the instructions issued from the instruction buffer;

executing the decoded instructions, wherein a number of instructions to be issued to the decoders in said simultaneously issuing the instructions is restricted in such a way that, while the instructions are executed, one of a plurality of executing units executes instructions more frequently than the rest of the plurality of executing units without halting operation of said plural executing units; and canceling the restricting, if predetermined cancellation conditions are fulfilled during the restricting the number of instructions to be issued to each of the decoders, wherein the predetermined cancellation conditions are the passage of a predetermined amount of time after the restricting of the number of instructions that are to be issued to each of the decoders is started.

8. A method for executing instructions according to claim 7, wherein each of the plurality of executing units is associated with two or more of the decoders so that, at said executing the decoded instructions, each of the plurality of executing units is operable to execute instructions decoded by the associated two or more decoders; and said simultaneously issuing the instructions includes, if the predetermined conditions are fulfilled, inhibiting issuing of the instructions from the instruction buffer to at least one of the associated two or more decoders of each of the rest of the plurality of executing units.

9. A method for executing instructions according to claim 7, further comprising:

detecting and monitoring a state in which that cross bypasses, through each of which a result of executing of an instruction by one of the plural executing unit is input to another one of the plurality of executing units, are frequently used, the predetermined conditions being detecting, at said detecting and monitoring, a state in which the cross bypasses are frequently used.

10. A method for executing instructions according to claim 9, wherein said detecting and monitoring a state includes detecting whether or not each of the cross bypasses is used, and detecting a loop that is a set of predetermined instructions to be repeatedly executed, and the state in which the cross bypasses are frequently used is when at least one of the cross bypasses is used and at the same time a loop is detected.

11. A method for executing instructions according to claim 10, wherein said detecting a loop is performed based on a history of one or more branch instructions included in the first-named instructions.

12. A method for executing instructions according to claim 7, further comprising:

counting the number of instructions currently stored in a reservation station temporarily storing the instructions decoded in the decoders before the instructions are dispatched to the plurality of executing units, wherein the predetermined conditions being that the result of said counting is equal to or larger than a predetermined threshold value.

* * * * *